United States Patent
Moroney et al.

(10) Patent No.: US 9,239,928 B2
(45) Date of Patent: Jan. 19, 2016

(54) SECURE TIME FOR MOBILE DEVICES

(71) Applicant: Google Technology Holdings LLC, Mountain View, CA (US)

(72) Inventors: Paul Moroney, San Diego, CA (US); Kuang M. Chen, San Diego, CA (US); Ambikacharan P. Makam, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 253 days.

(21) Appl. No.: 13/951,265

(22) Filed: Jul. 25, 2013

(65) Prior Publication Data
US 2014/0033323 A1    Jan. 30, 2014

Related U.S. Application Data

(60) Provisional application No. 61/676,817, filed on Jul. 27, 2012.

(51) Int. Cl.
| | |
|---|---|
| *G06F 21/60* | (2013.01) |
| *G06F 21/10* | (2013.01) |
| *G06F 21/72* | (2013.01) |
| *H04N 21/414* | (2011.01) |
| *H04N 21/442* | (2011.01) |
| *H04N 21/4627* | (2011.01) |
| *H04N 21/6334* | (2011.01) |
| *H04N 21/6547* | (2011.01) |

(52) U.S. Cl.
CPC .............. *G06F 21/60* (2013.01); *G06F 21/10* (2013.01); *G06F 21/725* (2013.01); *H04N 21/41407* (2013.01); *H04N 21/4424* (2013.01); *H04N 21/4627* (2013.01); *H04N 21/6334* (2013.01); *H04N 21/6547* (2013.01)

(58) Field of Classification Search
CPC ........................................................ G06F 21/10
See application file for complete search history.

(56) References Cited

U.S. PATENT DOCUMENTS

| | | | | |
|---|---|---|---|---|
| 7,437,578 | B2 * | 10/2008 | Menzl ............................ | 713/300 |
| 8,438,645 | B2 * | 5/2013 | Jain et al. ......................... | 726/26 |
| 2002/0169970 | A1 * | 11/2002 | Candelore ...................... | 713/193 |
| 2002/0169974 | A1 | 11/2002 | McKune | |
| 2006/0107042 | A1 * | 5/2006 | Kohmoto ........................ | 713/158 |
| 2007/0124819 | A1 * | 5/2007 | Strohwig et al. ................ | 726/26 |

FOREIGN PATENT DOCUMENTS

WO        2004075525  A1      9/2004

OTHER PUBLICATIONS

Patent Cooperation Treaty, International Search Report and Written Opinion of the International Searching Authority for International Application No. PCT/US2013/052334, Sep. 19, 2013, 12 pages.

* cited by examiner

*Primary Examiner* — Kambiz Zand
*Assistant Examiner* — Thanh Le
(74) *Attorney, Agent, or Firm* — Fox Rothschild LLP (57) ABSTRACT

Methods and devices for clock roll-back detection in non-secure mobile platforms are disclosed. A first time is received from a secure time source. The first time is recorded as a last known good time ("LKGT") in secure storage on the mobile device. The LKGT is advanced and stored whenever a triggering event occurs. The mobile device receives a second time from the secure time source and records the second time as a subsequent stored LKGT in secure storage.

20 Claims, 5 Drawing Sheets

FIG. 5

SECURE TIME FOR MOBILE DEVICES

CROSS-REFERENCE TO RELATED APPLICATIONS

The present application claims priority to U.S. Provisional Patent Application 61/676,817, filed on Jul. 27, 2012, which is incorporated herein by reference in its entirety.

TECHNICAL FIELD

The disclosure relates generally to the field of clock rollback detection in mobile devices or platforms.

BACKGROUND

Videos, music, and other types of audio video ("AV") media are conventionally sold to consumers through stores or mail-order companies. When AV media are sold through these types of outlets, the media are usually distributed on tangible media, such as digital video disks ("DVDs"), Blu-Ray disks, digital tapes, and so on. Another, alternative way of distributing AV media is to receive orders and to distribute, e.g., videos, electronically over a communications network, such as the Internet. A person can connect to a media provider and download AV media over the Internet, either for free or for a fee.

The downloaded video can be played back with appropriate AV playback software on the user's computer, either while the computer is connected to the Internet (that is, through streaming playback of the AV files) or at later time. Examples of common software for playing AV files include the Real-Player™ and the Windows™ MediaPlayer™ software. The user may organize his or her downloaded AV files on his computer. The user may also optionally transfer the downloaded AV files from his computer to a portable player that can play back AV files, so that he can leave his computer and still be able to view the previously downloaded AV files. Alternatively, the AV file can be downloaded directly to a user's portable device, such as a tablet or smart phone.

When one buys AV media stored on a tangible medium, such as a disk, the purchaser gets unlimited rights to play back the video content for his personal use. AV media that are provided through digital delivery to a playback device can have an associated expiration, such as time-limited playback rights, or rights that allow a user to play the AV files only a certain number of times. A user may therefore select AV media for a playback device and view the selected video during a certain time period or for a certain number of times for a smaller fee, or even for free, compared to what he would have paid if the video were stored on a tangible medium. If the user after this time likes the video, he can choose to refresh the expiration of the video and obtain new playback rights.

A problem with time-limited playback is that users may change internal clocks on playback devices that are used to keep track of the expiration times for content or may even hack the software that reads this local time clock. As a consequence, the time limitation imposed by the AV provider will not work, and the AV providers will have little interest in providing AV files for a reduced fee compared to the fee for unlimited playback. It is therefore likely that content providers would offer a more limited service or charge higher prices than what would be necessary if there were a way to guarantee that users could not manipulate the imposed expiration limitations on the AV files, leaving potential customers with less than a full range of options to choose from.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The examples described are directed to a DRM system operating with time-based licenses that may support content rental, subscription models, and previews. This type of DRM system typically supports various mobile device types. Although the present examples are described and illustrated as being implemented in a mobile device system, the system described is provided as an example and not a limitation. Mobile devices may include pocket personal computers ("PCs"), cellular phones, music players, personal digital assistants, tablet devices, and the like. These mobile devices are typically configured to operate in a system that includes the Internet, PCs, and the like to facilitate license and media-content transfer.

A typical licensing system is a DRM system. As those skilled in the art will appreciate, the present example is suitable for application in a variety of different types of systems that operate under a license. The use of a playback period, or an expiration time, may be useful in the management of licensed content for these types of systems and in particular systems that include a secure clock that tends to prevent tampering with the time-based license by setting the clock back.

According to a first aspect, a method of updating a last known good time ("LKGT") in a mobile device includes: receiving a first time from a secure time source, recording the first time as a first stored LKGT in secure storage on the mobile device, advancing and storing the LKGT whenever a triggering event occurs, receiving a second time from the secure time source, and recording the second time as a subsequent stored LKGT in secure storage on the mobile device.

Figure 1:
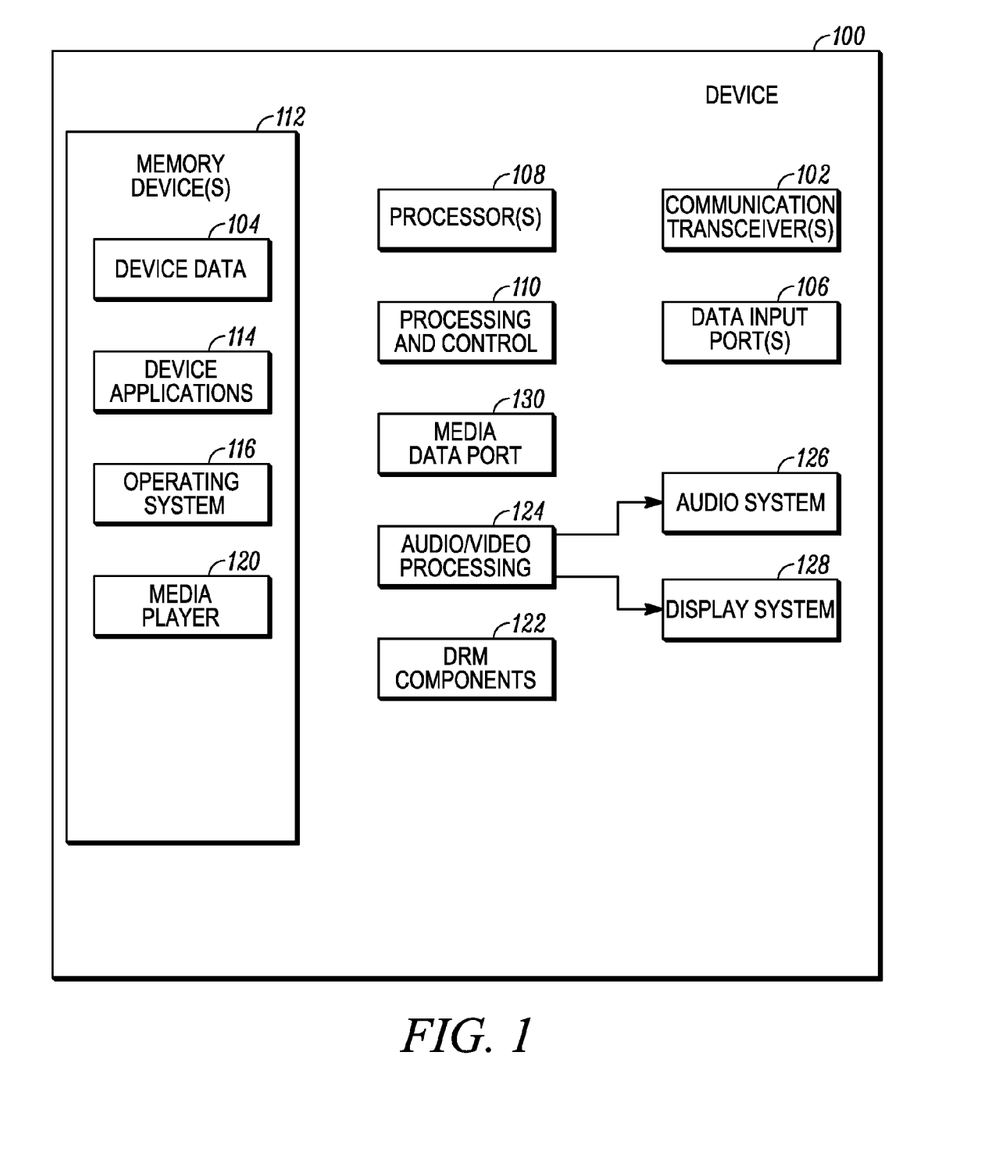
FIG. 1 illustrates various components of an example electronic device that can implement digital-rights management ("DRM") software according to embodiments of the disclosure.

FIG. 1 illustrates various components of an example electronic device 100 that can be implemented as a mobile device described with reference to any of the later FIGS. 2 through 5. In some embodiments, the electronic device may be implemented in any form of device that can receive and playback video content, such as any one or combination of a communication, computer, media playback, gaming, entertainment, mobile phone, and tablet computing device.

The electronic device 100 includes communication transceivers 102 that enable wired or wireless communication of device data 104, such as received data, data that are being received, data scheduled for broadcast, data packets of the data, etc. Example transceivers include wireless personal area network radios compliant with various Institute of Electrical and Electronics Engineers ("IEEE") 802.15 standards, wireless local area network radios compliant with any of the various IEEE 802.11 standards, wireless wide area network radios for cellular telephony, wireless metropolitan area network radios compliant with various IEEE 802.15 standards, and wired local area network Ethernet transceivers.

The electronic device 100 may also include one or more data input ports 106 via which any type of data, media content, and inputs can be received, such as user-selectable inputs, messages, music, television content, recorded video content, and any other type of audio, video, and image data received from any content or data source. The data input ports may include Universal Serial Bus ("USB") ports, coaxial cable ports, and other serial or parallel connectors (including internal connectors) for flash memory, DVDs, compact disks, and the like. These data input ports may be used to couple the electronic device to components, peripherals, or accessories such as microphones and cameras.

The electronic device 100 includes one or more processors 108 (e.g., any of microprocessors, controllers, and the like), which process computer-executable instructions to control operation of the device. Alternatively or in addition, the electronic device can be implemented with any one or combination of software, hardware, firmware, or fixed-logic circuitry that is implemented in connection with processing and control circuits, which are generally identified at 110. Although not shown, the electronic device can include a system bus or data-transfer system that couples the various components within the device. A system bus can include any one or combination of different bus structures, such as a memory bus or memory controller, a peripheral bus, a universal serial bus, and a processor or local bus that utilizes any of a variety of bus architectures.

The electronic device 100 also includes one or more memory devices 112 that enable data storage, examples of which include random access memory, non-volatile memory (e.g., read-only memory or flash memory), and a disk-storage device. A disk-storage device may be implemented as any type of magnetic or optical storage device, such as a hard disk drive, a recordable or rewriteable disc, any type of DVD, and the like. The electronic device 100 may also include a mass storage media device.

A memory device 112 provides data-storage mechanisms to store the device data 104, other types of information and data, and various device applications 114 (e.g., software applications). For example, an operating system 116 can be maintained as software instructions within a memory device and executed on the processors 108. The device applications may also include a device manager, such as any form of a control application, software application, signal-processing and control module, code that is native to a particular device, a hardware-abstraction layer for a particular device, and so on. The electronic device may also include a media player 120, such as for a mobile device. The electronic device also includes DRM components 122 which include a DRM module (not shown) that can be implemented in any one or combination of software, hardware, firmware, or the fixed-logic circuitry to implement embodiments of time-triggering events in a mobile device. In some embodiments, the DRM components 122 are integral to other modules included in device 100. In other embodiments, the DRM components are separate from other modules on device 100.

The electronic device 100 also includes an audio and video processing system 124 that generates audio data for an audio system 126 and generates display data for a display system 128. The audio system and the display system may include any devices that process, display, or otherwise render audio, video, display, or image data. Display data and audio signals can be communicated to an audio component or to a display component via a radio-frequency link, S-video link, HDMI (high-definition multimedia interface), composite video link, component video link, DVI (digital video interface), analog audio connection, or other similar communication links, such as media data port 130. In implementations, the audio system and the display system are integrated components of the example electronic device.

Figure 2:
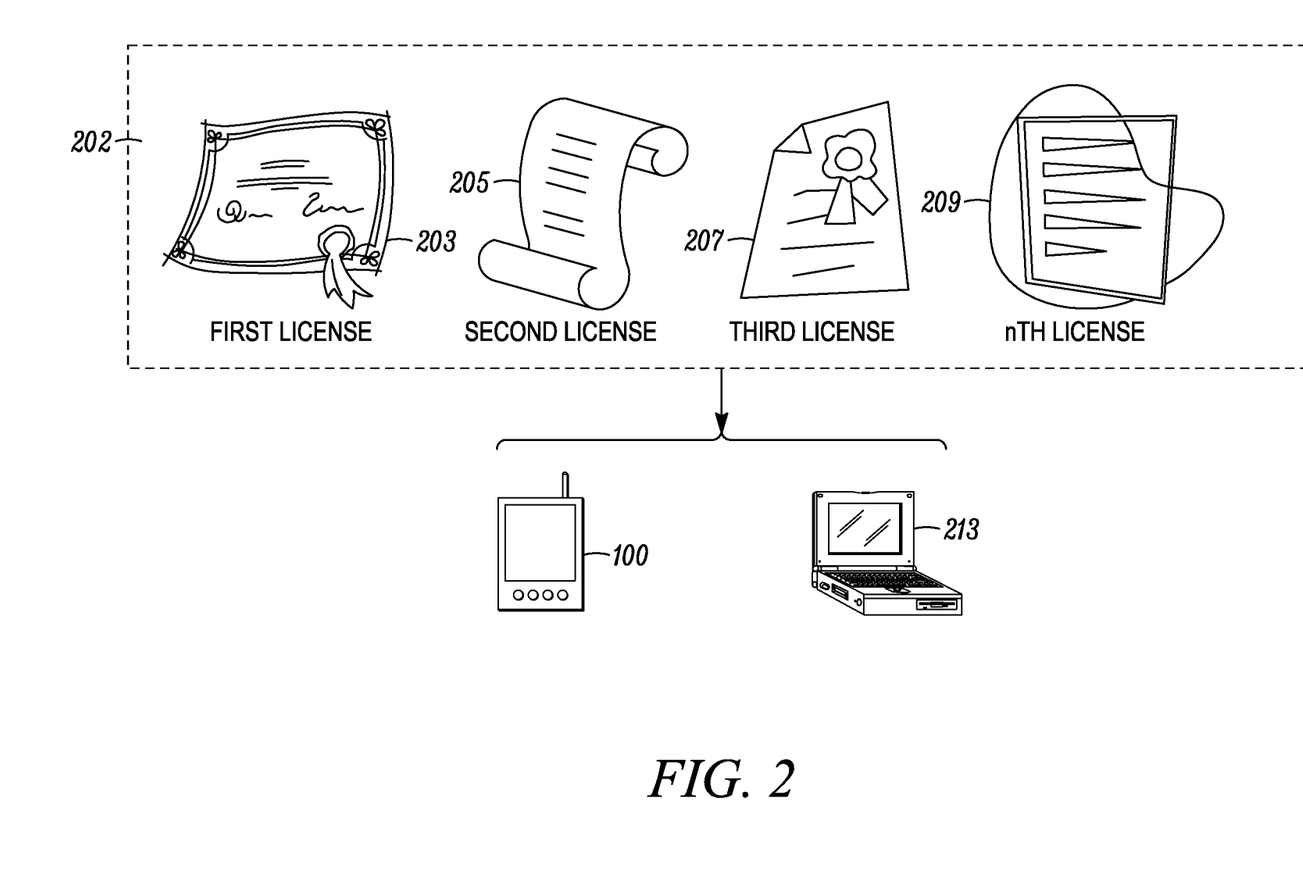
FIG. 2 illustrates a plurality of licenses (also known as rights objects), associated with example electronic devices, according to embodiments of the disclosure.

FIG. 2 illustrates a plurality of licenses 202. Each license 203, 205, 207, 209 of the plurality of licenses 202 may comprise time-based licenses. A time-based license is a particular type of license that may be associated with a period that a user may play back the content, also referred to hereinafter as a playback period or expiration time.

A license typically refers to a media file (not shown) that has been downloaded to the mobile device 100 or to a PC 213. Licenses may be downloaded with the content or may be downloaded separately. The number of licenses on the mobile device 100 can be large, such that a user typically cannot keep track of the individual conditions applied to each media file by its associated license. Occasionally, more than one license will be associated with a media file.

Licenses typically regulate the use of content. Most current DRM solutions rely on unique identification of user devices, such as mobile devices. In such systems each license may be bound to a unique consumer electronics device (or playback device), so the license stored in one mobile device typically cannot be transferred or used by another device. The license may be provided with information to specify a playback period or an expiration time for the particular media being controlled by that license. The licenses are typically stored separately from the content, typically in a dedicated storage area such as a secure store.

Licenses may include numerous functions other than simply giving permission to use an associated file. For example, information may be provided in the license to control how the file is played by setting the playback period. Playback periods may be used to allow play back of content to continue for limited time periods, on a license-by-license basis. For example, the limited time period for a rental may be defined as one day, and the terms may specify that the one day begin during the next 7 days. Another example is information related to expiration time, where content cannot be played after a specific date and time.

A time-based license may allow for content rental, subscription models, premiers, and previews. A time-based license typically requires that a clock is present on the mobile device before it can be used. Thus using playback periods or expiration times in association with this type of license will also improve a user's experience by allowing content to be enjoyed according a wide range of business models.

Being able to provide playback periods or expiration times and to vary them by individual content file allows content owners more control in licensing their content. Playback periods and expiration times may be part of the DRM system that is invisible to the user. Licenses and the playback period associated with them may be managed by an application program or by a DRM system. A user's experience may be improved if licenses specify a playback period or expiration time, yet an interruption to the mobile device clock does not tend to interfere with use of the mobile device. Generally, as used herein, the clocks on mobile devices are not secure, meaning that a user may manually change the time on the mobile device clock or otherwise modify his device so as to alter or freeze the time.

Figure 3:
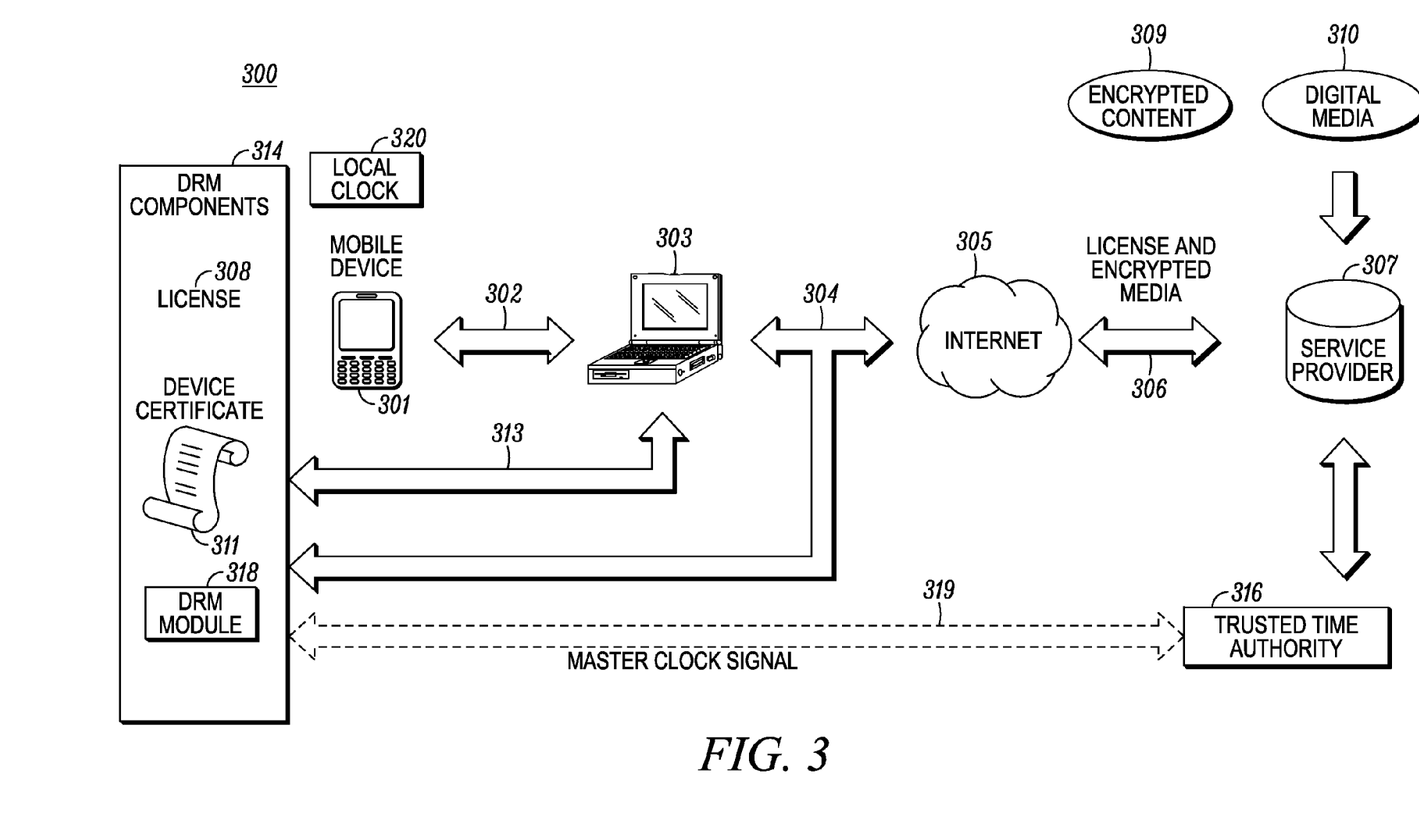
FIG. 3 is a block diagram of an example of a DRM system according to embodiments of the disclosure.

FIG. 3 is a diagram of a DRM system including time-based licenses and a local clock. DRM system 300 typically provides a collection of processes for the secure distribution of multimedia content 310 from a service provider 307 coupled 306 to an insecure channel, such as the Internet 305. Digital media content for viewing or playback would typically include music files, picture files, video files, documents, etc.

In particular, content may be anything that a provider desires to protect such as music, video, multimedia, pictures, and the like. Content is typically regulated to prevent its unauthorized use by providing licenses or other tools such as encryption. Content may be audio, video, textual, encrypted, unencrypted, compressed, uncompressed, or otherwise manipulated. In a DRM system, the content (or equivalently media, media files, files, or the like) to be played can typically be freely transferred. In a DRM system, the playback of the content is controlled, or allowed, by a license that may be typically stored on a specific mobile device. Those skilled in the art will realize that the term "play" as used herein may also be construed to mean consume or other equivalent terms that indicate that there are limits placed upon accessing the media file governed by the license. Digital media file 310 is typically encrypted by service provider 307 prior to transmission and is typically decrypted for consumption at the mobile device 301 or PC 303.

In some embodiments, PC 303 may be used to couple 304 to the Internet 305. The computer may also be used to transfer content and licenses from the service provider 307 to mobile device 301 via the path 302 shown. The personal computer and mobile devices may operate utilizing any number of suitable operating systems known to those skilled in the art to implement the desired DRM processes being activated. The instructions for implementing the functions described in this application may exist as software, hardware, or a combination of both.

In some embodiments, PC 303 may act as a main storage location and have a large number of licenses and media files stored on it. The licenses can have playback periods, unlimited rights, rights to play the file a certain number of times, rights to play the file until a certain date, and the like. Protocols for transferring information to the PC 303 and to mobile device 301 over paths 302 and 304 may be achieved by conventional connections such as Ethernet, USB, infrared, Bluetooth, the Media Transfer Protocol, and the like. These pathways may be useful for transmitting licenses and content.

Generally, mobile device 301 may be coupled 304 to a service provider 307 without using the personal computer 303 as an intermediary. In this example, the mobile device 301 operates to download media and licenses directly from the Internet 305.

A DRM-capable device, such as mobile device 301, typically includes a number of DRM components 314 utilized by a DRM system. The components 314 are typical, but not limiting, of DRM components. Typical DRM components may include one or more licenses 308. Licenses 308 may include one or more designated playback periods (not shown). Also shown as part of a typical DRM system is a device certificate 311 that may uniquely identify the mobile device 301 to the DRM system 300. Device certificates may provide cryptographic handshake information that may facilitate the transfer of information, such as a master clock signal 319 from a trusted time authority 316.

In a typical application, DRM system 300 protects digital media (content) 310 by providing encrypted data files 309. Since files 309 are encrypted, the data themselves are protected. Thus, the files 309 may be moved, archived, copied, or distributed without restriction. There is no need to hide files or make them inaccessible or to put special protection in place when files are transmitted from system to system. However, copying a file and giving it to a friend will not enable that friend to use the file. In order to be able to use an encrypted file, users must obtain the rights to do so, a rights object or license 308. This license 308, that typically includes a playback period or expiration time, is a way of exercising control over the encrypted file 309 and the unencrypted version 310 of the file. A license 308 is typically granted to a single device 301 or registered to a single user.

The DRM system described may include a trusted time authority 316. The trusted time authority 316 may be provided by the service provider 307 or by another suitable source. For example, the trusted time authority could be supplied by another PC or even by a system clock available from another source such as by a wireless link to a cellular telephone master clock. The trusted time authority 316 typically provides a known time to a mobile device 301 so that the DRM system knows the correct time at that moment. The trusted time authority 316 may be coupled through the service provider or alternatively 319 directly to a mobile device 301. The transaction to deliver the secure clock time may be a cryptographically keyed exchange. The mobile device typically includes a DRM module 318 that processes the signal from the trusted time authority. In some embodiments, the DRM module 318 includes a secure LKGT and reads a local clock 320 on the device. The secure time delivered to the device is accurate and secure at that moment of delivery, but the DRM module 318 needs to count that time forward as the true, real, time advances. As mentioned above, the local clock 320 in the device is generally not secure and therefore is accessible to a user in various ways, which may allow tampering. The DRM module 318 reads this untrusted local clock 320 and derives information to advance its secure LKGT so that content may be expired correctly based upon this LKGT.

In a DRM-capable device, after a local-clock reset or time zone change, or glitch, or any other legitimate major change in the local-clock value, it is undesirable for the content license expiration time to be incorrectly processed. Thus the DRM module may advance its time estimate so as to be insensitive to these large changes. Further, content with time-based licenses should not be played at all after the first time the application is installed, if the device has not been able to reach a secure time source.

In general, there may be three time sources for a DRM-capable device: (1) server time or other secure time source, which is known secure when acquired, (2) local time or device time, which is potentially insecure when read, and (3) "running time" or "elapsed time," which can be estimated by knowledge of how long various processes take. For example, the DRM module may seek to 'set' its internal time estimate (or LKGT) with secure server time and then to increment time forward at every opportunity. Unfortunately, local time may be reset by the user when he likes or when his battery dies. Rather than try to block clock resets, the internal secure time estimate may be decoupled from absolute local time. For example, local time may be read twice and used to compute a 'delta' which is applied to move forward the estimated secure time.

In another example, in Android™ and iOS™ software applications environments, a secure mobile device will seek to read server time when the client device is on-line, often enough to provide relevant estimates but not so often as to overload the DRM server system. The mobile device will also read local time during playback, or at play start or end, when the user is truly consuming content. Upon a second read of local time, the first time is subtracted from the second time to determine a delta time elapsed, and the delta time is applied to move forward the LKGT estimate. Alternatively, the mobile device may read local time on a somewhat regular basis, perhaps determined by a process that goes to "sleep" for some time period, again to compute a delta elapsed time to move forward the internal estimate.

Since all uses of local time are subject to occasional inconsistencies (e.g., because the user may be able to set mobile device time or otherwise modify it), certain criteria may be followed:

- Internal time estimates do not move backwards, other than on a secure server time reception.
- If there is a large jump forward in time, then the delta is not applied. For example, if there is a regular every 3 to 7 minute local time read interval, then any computed time delta greater than 10 minutes is not applied.
- If the delta is produced from playback-related events such as key requests, then any delta well outside the known key update interval is not applied.
- If the delta computed results from irregular playback events such as 'stop' or 'pause,' then any delta outside that expectation (e.g., an hour) is not applied.

Figure 4:
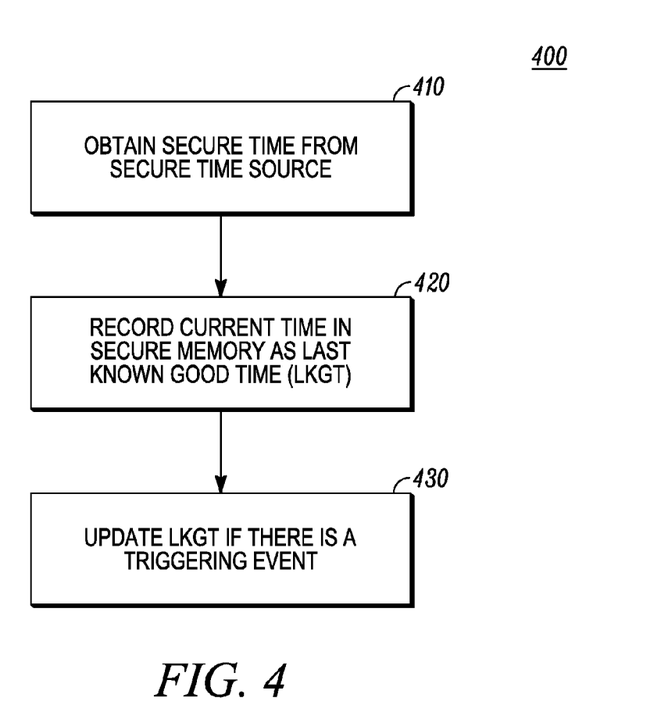
FIG. 4 is a flowchart showing the process of updating the last known good time in an electronic device according to embodiments of the disclosure.

FIG. 4 is a flow diagram showing a process 400 for advancing an LKGT estimate in a mobile device. In step 410, the mobile device user launches some client content-consumption application, which includes the DRM module. The DRM module is in communication with a secure time source, such as a server, and obtains the current time. In some embodiments, the mobile device obtains the current time over a secure tunnel.

At step 420, the current time is recorded as the LKGT in secure storage on the mobile device.

In step 430, the LKGT in secure storage is advanced or updated if there is a triggering event. Examples of triggering events include: (1) preset instructions to read the clock on the mobile device at a coarse approximately regular time interval and increasing the LKGT by the delta local-clock increase observed (examples can include processes that call the operating system 'sleep' command, or software counters, or no-ops), (2) preset instructions to read the local clock on the mobile device during playback of content at the time of any key request, or just before it, on the mobile device and increasing the LKGT by the delta time of the local clock observed on the mobile device, and (3) preset instructions to read the time on the secure time source at some longer coarse interval (every two hours or more, for example) and setting the LKGT to that secure source time.

In some embodiments, the coarse time interval for reading the local clock on the mobile device is between 2 and 10 minutes. In some embodiments, the coarse time interval is between 3 and 7 minutes. Generally, the new local-time clock observation is compared against the previous local-time observation to ensure that the new value is greater than the previous value. For example, if the new value is equal to or less than the previous value, then the new value may be considered to be an error (e.g., a time hack or major reset), and the error may be recorded in secure storage on the mobile device.

In some embodiments, when a preset number of errors saved in secure storage on the mobile device has been reached, the DRM module may determine that an improper attempt has been made to alter the playback expiration or interval. The DRM module may attempt to reach the secure time server to get secure time and determine content expiration based upon it. If the server cannot be reached, then the user may be prompted to move to a location where connectivity can be restored. The preset number of errors may be set to any number, but a lower number such as three may allow for legitimate time resets while preventing a user from repeatedly attempting to roll-back or hack the clock on the mobile device in order to extend a rental or subscription time for AV content. In some embodiments, the DRM module may be configured to suspend playback of time-related content when the preset error threshold or maximum is reached, especially if secure time cannot be re-established from a secure server. In some embodiments, the stored error count is reset occasionally (e.g., weekly, bi-monthly, monthly, etc.) so that the error count does not reach its threshold from legitimate causes and thus fails to operate as intended.

In order to ensure that the LKGT is updated as legitimately as possible, any local-clock delta observation that is negative is ignored (i.e., time going backwards). As mentioned above, local time can be read on a semi-regular basis as driven by an independent process (e.g., a software counter, or a "sleep" call, or both) or it can be driven by some other process related to playback. For example, because playback relies on decryption, the DRM module must supply keys to decrypt the content. This portion of the DRM module cannot be bypassed, or a user would not be able to play back the content. Thus, content-key generation may be a preferred time to read local-clock time and compute a delta and update the LKGT. For content-key generation, each key may be associated with a certain duration of content, such as 5 to 30 seconds of content. Thus, the content key changes after the time duration or interval associated with the content segment. Such change may hereinafter be referred to as a content-key change interval.

Figure 5:
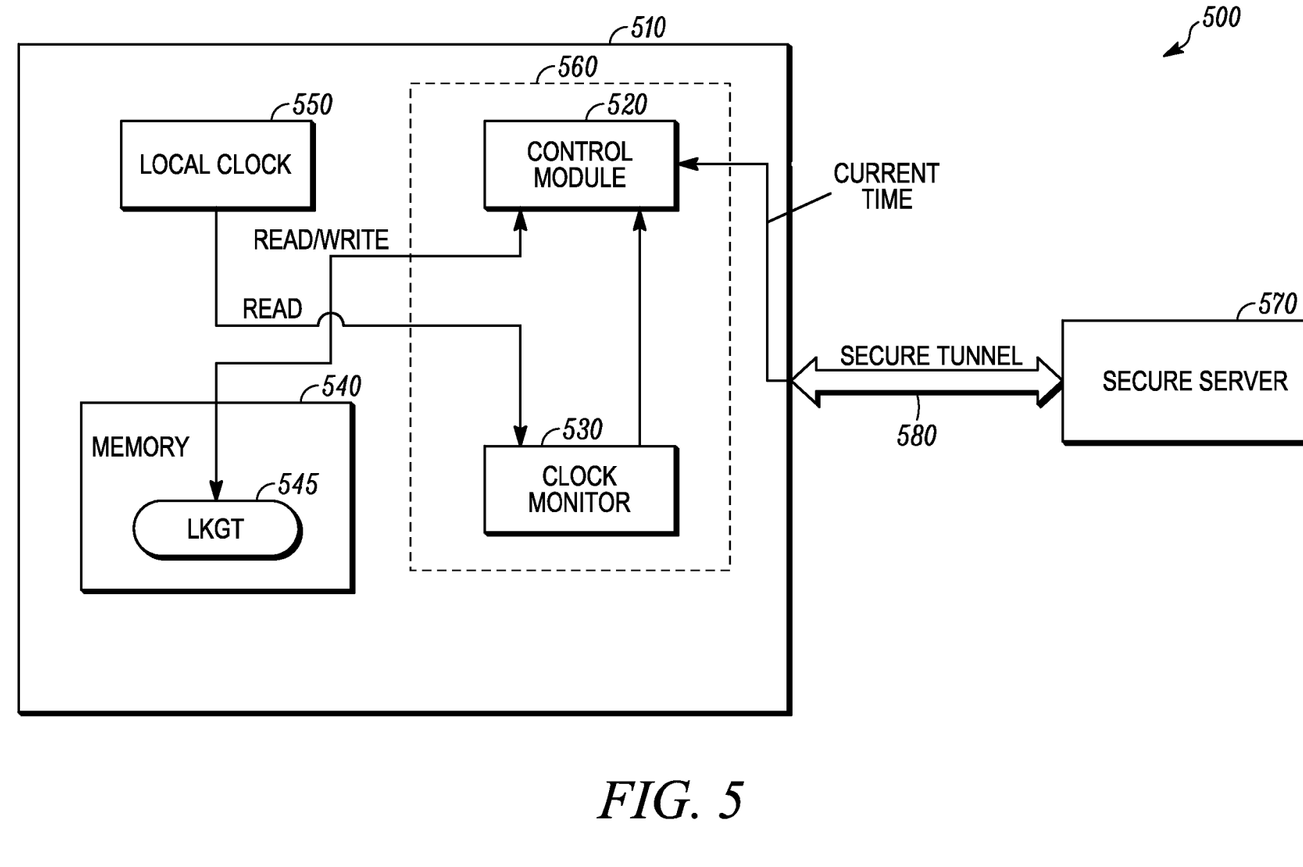
FIG. 5 is a block diagram showing a secure time source in communication with an electronic device according to embodiments of the disclosure.

FIG. 5 is a diagram of an example DRM system including a mobile device and secure time source for implementing process 400 of FIG. 4. DRM system 500 typically provides a collection of processes for the secure advancement of LKGT in mobile device 510.

Mobile device 510 includes a control module 520, a local-clock monitor 530, a secure or obfuscated memory 540 for storing LKGT 545, and a local clock 550. Mobile device 510 is in communication with secure time source or server 570 via secure tunnel 580. In some embodiments, a DRM module 560 that updates the LKGT includes control module 520 and local-clock monitor 530. In some embodiments, local-clock monitor 530 is configured to read local clock 550 at coarse intervals or during key updates, computing deltas, looking for errors, and reporting back to control module 520.

In some embodiments, mobile device 510 checks secure time from a secure time server 570. The LKGT may always be updated from the secure time server 570. However, in many instances, such as when the mobile device is not on-line or the time source is busy or faulty, the server secure time information may not be available.

The LKGT 545 may be updated from an untrusted resource but only if time appears to move forward when the local system clock 550 is read. The observed delta time advance is then used to move the LKGT forward, and the new value of LKGT is then stored internally in protected form in memory 540.

In some embodiments, checking the local time from an unsecure local resource as often as possible is used to reduce time roll-back or hacking attempts. This may be achieved in two ways: (1) adding a time check or update whenever decryption keys are provided during playback (which could even be every 10 seconds) and (2) adding a separate process to wake up every 5 minutes or so, irregularly, and check and update the time.

In some embodiments, if any local-clock observation shows the exact time value as the previous observation, or an older one, then the mobile device 510 is being hacked, or possibly reset, and the control module 520 may stop playback or add a minimum N minutes to the LKGT, forcing it forward. In this case, N should be chosen small enough so that the user does not lose a legitimate portion of a rental or playback. Thus, N should be less than the average value of the expected time-check intervals. Control module 520 may alternatively add such a forced update only if there are two consecutive such results.

In some embodiments, if a user tries to replace a protected LKGT value in persistent memory with a prior value that was protected (e.g., a replay attack), and also hacks the local time-check process, then there might be an effective time reversal and an unintended stolen rights extension. Control module 520 may prevent or minimize this by checking the LKGT value against all of the stored content rights objects or licenses to make sure that the LKGT is not older than the creation time of any of those objects. If the LKGT is older, then the control module 520 can either update it to the most recent rights-object creation time and proceed or can shut down until the next connection to the secure server and secure source of time. In some embodiments, mobile device 510 can initiate the connection to the secure time source if there is network connectivity.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of updating a last known good time ("LKGT") in a mobile device, the method comprising:
    receiving a first time from a secure time source;
    recording the first time as a first stored LKGT in secure storage on the mobile device;
    advancing the LKGT whenever a triggering event occurs by:
        accessing a previous local-clock observation that was obtained from a local clock of the mobile device,
        determining a current local-clock observation from the local clock,
        determining a difference between the current local-clock observation and the previous local-clock observation,
        increasing the LKGT by the difference to produce a second LKGT, and
        storing second LKGT in secure storage on the mobile device;
    receiving a second time from the secure time source; and
    recording the second time as a subsequent stored LKGT in secure storage on the mobile device.

2. The method of claim 1 wherein the triggering event comprises:
    preset instructions to read a local clock for a local-clock observation on the mobile device at a coarse time interval.

3. The method of claim 2 wherein the coarse time interval is between 2 and 10 minutes.

4. The method of claim 2 wherein the coarse time interval is determined by an element selected from the group consisting of: a software counter, a sleep timer, and a combination of a software counter and a sleep timer.

5. The method of claim 1, wherein if the difference between the current local-clock observation and the previous local-clock observation is negative, then not modifying the LKGT.

6. The method of claim 1 wherein if the difference between the current local-clock observation and the previous local-clock observation is negative or zero, then recording the event as an error in secure storage on the mobile device.

7. The method of claim 6 wherein if a preset number of errors saved in secure storage on the mobile device has been reached, then trying to connect to a secure time source.

8. The method of claim 6 wherein if the preset number of errors is reached, then suspending playback of content.

9. The method of claim 1, wherein if the difference between the current local-clock observation and the previous local-clock observation is negative or zero, then advancing LKGT by a fixed amount less than the coarse time interval.

10. The method of claim 1 wherein the secure time source comprises a server clock.

11. The method of claim 1 wherein the triggering event comprises:
    preset instructions to read a local clock for a local-clock observation on the mobile device during playback of content on the mobile device at a time a new content decryption key is produced, or just prior to the time the new content decryption key is produced.

12. The method of claim 11 wherein if the difference between the current local-clock observation and the previous local-clock observation is negative, then not modifying the LKGT.

13. The method of claim 11 wherein if the difference between the current local-clock observation and the previous local-clock observation is negative or zero, then recording the event as an error in secure storage on the mobile device.

14. The method of claim 13 wherein if a preset number of errors saved in secure storage on the mobile device has been reached, then trying to connect to a secure time source.

15. The method of claim 14 wherein the preset number of errors is set to three.

16. The method of claim 14 wherein if the preset number of errors is reached, then suspending playback of content.

17. The method of claim 11 wherein if the difference between the current local-clock observation and the previous local-clock observation is negative or zero, then advancing LKGT by a fixed amount less than an average content key-change interval.

18. The method of claim 11 wherein the secure time source comprises a server clock.

19. The method of claim 1 wherein the triggering event comprises:
    preset instructions to read the time on the secure time source at a coarse time interval and updating the LKGT to that secure time value as a subsequent stored LKGT.

20. A mobile device configured to update a last known good time ("LKGT"), the device comprising:
    one or more computer processors; and a non-transitory computer-readable storage medium comprising instructions that, when executed, control the one or more computer processors to be configured for:
receiving a first time from a secure time source;
recording the first time as a first stored LKGT in secure storage on the mobile device;
advancing the LKGT whenever a triggering event occurs by:
  accessing a previous local-clock observation that was obtained from a local clock of the mobile device,
  determining a current local-clock observation from the local clock,
    determining a difference between the current local-clock observation and the previous local-clock observation,
  increasing the LKGT by the difference to produce a second LKGT, and
  storing second LKGT in secure storage on the mobile device;
receiving a second time from the secure time source; and
recording the second time as a subsequent stored LKGT in secure storage on the mobile device.

\* \* \* \* \*